United States Patent [19]

Michel

[11] 4,108,957
[45] Aug. 22, 1978

[54] METHOD FOR MANUFACTURE OF PHOSPHORIC ACID FROM PHOSPHATE ROCK

[76] Inventor: Robert Michel, c/o Toren, McGeady and Stanger P.C., 521 Fifth Ave., New York, N.Y. 10017

[21] Appl. No.: 761,855

[22] Filed: Jan. 24, 1977

Related U.S. Application Data

[63] Continuation-in-part of Ser. No. 665,330, Mar. 9, 1976, abandoned.

[51] Int. Cl.² ............................................. C01G 43/00
[52] U.S. Cl. ............................................. 423/3; 423/11; 423/18; 423/20; 423/308; 423/309; 423/319; 423/320; 423/167; 423/635
[58] Field of Search .................. 423/3, 11, 18, 20, 319, 423/320, 308, 309, 167, 635

[56] References Cited

U.S. PATENT DOCUMENTS

| | | | |
|---|---|---|---|
| 2,882,123 | 4/1959 | Long | 423/18 X |
| 3,311,450 | 3/1967 | Alon et al. | 423/319 |
| 3,363,978 | 1/1968 | De Rooij et al. | 423/319 |
| 3,792,151 | 2/1974 | Case | 423/166 |
| 3,928,016 | 12/1975 | Michel | 71/42 |
| 4,012,491 | 3/1977 | Hauge | 423/309 |
| 4,044,107 | 8/1977 | Houghtaling | 423/320 |

Primary Examiner—Benjamin R. Padgett
Assistant Examiner—E. Suzanne Parr
Attorney, Agent, or Firm—Toren, McGeady and Stanger

[57] ABSTRACT

A method is disclosed for the manufacture of phosphoric acid directly from phosphate rock wherein the crushed phosphate rock is mixed with dilute phosphoric acid to form a slurry and the slurry is then heated to produce calcium monophosphate. Thereafter, oxalic acid is added to the slurry to precipitate the calcium therein as calcium oxalate which is separated. The liquid resulting therefrom which contains the phosphoric acid from the rock is then treated conventionally to recover the phosphoric acid therein.

15 Claims, 1 Drawing Figure

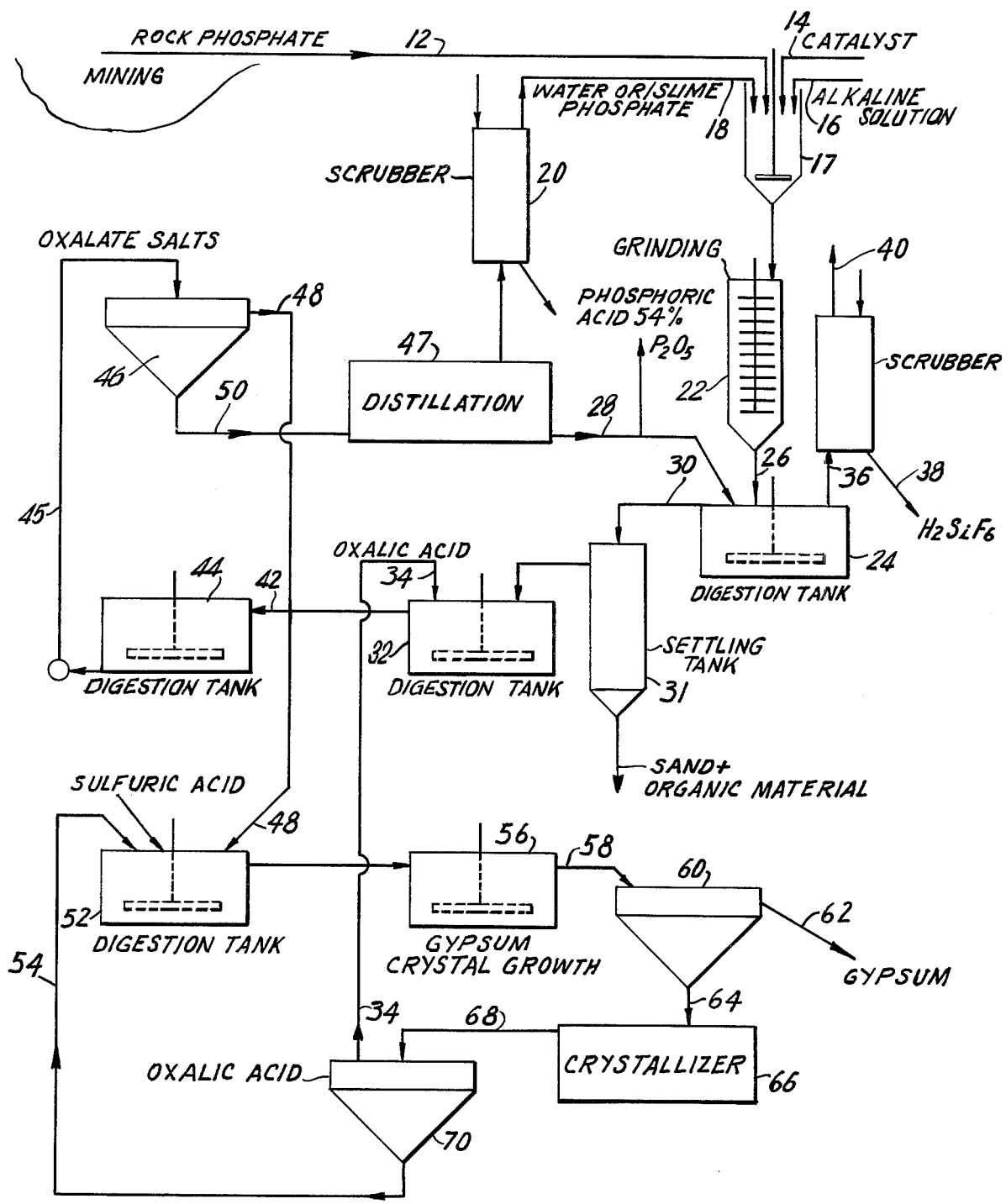

ure of phosphoric acid from naturally occurring phosphate rock and, particularly, to a method for obtaining high purity calcium sulphate and phosphoric acid from the phosphate rock.

METHOD FOR MANUFACTURE OF PHOSPHORIC ACID FROM PHOSPHATE ROCK

CROSS REFERENCE

This is a continuation-in-part application based on application Ser. No. 665,330, filed Mar. 9, 1976, now abandoned.

BACKGROUND OF THE INVENTION

1. Field of the Invention

This invention relates to a method for the manufacture of phosphoric acid from naturally occurring phosphate rock and, particularly, to a method for obtaining high purity calcium sulphate and phosphoric acid from the phosphate rock.

2. Description of the Prior Art

A number of processes are known for the conversion of phosphate rock into phosphoric acid and other valuable phosphorus containing materials. Generally, there are based on the formation of mono calcium phosphate, $CaH_4(PO_4)_2$ which is a water soluble compound. This is generally effected by treating the phosphate rock with sulfuric acid to form a mixture which consists predominantly of mono calcium phosphate and calcium sulphate.

These prior art processes make use of strong mineral acids for strong bases in some cases and the processes are usually carried out at relatively high temperatures which, in turn, require elaborate installations and costly materials for the plant equipment, such as, refractories, stainless steel, and the like. Moreover, a number of the prior art processes cannot be carried out effectively and efficiently on a continuous basis.

Additionally, in the United States wherein phosphate rock is mined primarily by strip-mining, the excavator or the dragline deposits the ore in sumps where it is then broken up by water jets to produce a slurry. This slurry is pumped to a beneficiation plate where it undergoes a complex procedure involving wet-screening, hydroseparation, and floatation. The beneficiation process is for the purpose of concentrating the rock so that the subsequent processes will be that much more efficient.

Certain types of rock which contain an excess of calcium carbonate or organic matter are calcined after shaking, cooling and washing to remove the lime overflow.

Consequently, the beneficiation pretreatment is quite expensive and results also in the wasting of a good part of the phosphate, generally estimated at being about one third of the initial rock. One of the reasons for this is that much of the rock after treatment has such a small particle size that it cannot be separated from the slime and tailing.

Moreover, phosphate rock from various parts of the country require specific pretreatments or additional treatments depending on the type of impurities which may be contained therein, for example, iron, aluminum, magnesium etc.. Thus, depending on the source of phosphate rock, the pretreatment steps including the beneficiation must be tailored for a particular source.

Additionally, phosphate slime, a waste product from such processes presents a major pollutant, since it is difficult to treat further to recover additional phosphate values.

SUMMARY OF THE INVENTION

I have discovered a method for the direct treatment of phosphate rock without the need for any kind of beneficiation process which treatment can extract the phosphoric acid values therefrom and also produce high quality calcium sulphate. This can be accomplished without the use of mineral acids and the consequential requirements with respect to processing conditions and equipment which accompany the use of such corrosive materials. Moreover, this process can be used on any type of phosphate rock source without requiring any extensive specific tailoring for the given rock source. Moreover, phosphate rock ore of even low grades can be efficiently processed in a continuous manner to produce high yields of phosphoric acid.

More particularly, I have discovered that by first crushing rock directly from the mining or excavation without any other preparation and preparing a slurry of the rock in dilute phosphoric acid, which slurry is then reacted with oxalic acid, calcium oxalate can be precipitated from the slurry along with various metal impurities therein. The liquid from the separation can be concentrated in conventional manner to produce a high yield of phosphoric acid. Also, slimes and phosphoric slurry can be reprocessed alone, or in a more preferred manner, mixed with raw, wet rock phosphate ore.

BRIEF DESCRIPTION OF THE DRAWING

The drawing is a schematic diagram of the process in accordance with the present invention.

DESCRIPTION OF THE PREFERRED EMBODIMENT

Referring to the drawing, phosphate rock in line 12 is introduced to a mixer 17 along with an appropriate metallic catalyst in line 14, such as, iron sulphate having 1% iron, and an alkaline solution from line 16 to adjust the pH to a range from about 7.15 to 9.0

It is further possible to introduce water along with slimes, tailings, debris, and other phosphatic slurry through line 18 for processing in this invention. Indeed, this is one of the major advantages of the present invention with respect to the use of such otherwise difficult to process materials.

These materials are mixed in mixer 17 and then introduced to grinding step 22.

It is noted in this regard that it is possible to carry out a portion of the hydrolysis discussed hereinafter in the grinding step and also in a subsequent digestion tank. Alternatively, the grinding step can be a conventional grinding step with the entire hydrolysis being carried out in a subsequent digestion tank.

In any event, the discussion hereinafter shall relate to the hydrolytic type of grinding wherein a part of the hydrolysis is carried out in the grinder. The mixture in grinder 22 is heated to a temperature in the range from about 60° to 80° C in order to speed up the hydrolysis and decrease the corrosion of the equipment. Additionally, this serves to stabilize the colloidal slurry. However, these conditions are not necessarily critical but are only preferred.

The hydrolytic grinding process breaks down the various minerals in the rock and particularly converts the phosphorus values to mono calcium phosphate as noted hereinafter. The mineral components are hydrolized to a submicron size, the majority of the particles being in the range from about 0.1 to 1.0 micron with an average specific surface area from about 200 to 2000 m²/g which produces a thixotropic stable colloidal slurry.

A typical type grinding unit which can be used for this type of process is the ATTRITOR, made by the Union Process Company of Akron, Ohio. Such a unit has a retention time of from 1 to 5 minutes with an energy requirement as low as 3 to 4 kW per ton of rock. This unit has been piloted at a rate of several tons per hour utilizing wet, coarse rock phosphate (15 mm) to submicron size. However, of course, other types of conventional grinding equipment may be used.

Also, the rock phosphate can also be digested completely in the grinding equipment wherein weak phosphoric acid would have to be added. In this case, however, since the grinding and digesting steps are shorter in time, some problems can occur, particularly with rock phosphate which is highly concentrated in organic material, calcium carbonate, sulfides or fluorides. These would produce an excess of foaming and gas escape during the grinding stage.

It is thus recommended to process the rock in two separate stages, first in an alkaline stage where any type of rock phosphate could be ground without forming and avoiding the gas formation or corrosion problems as well as achieving better quality control of the size of the final colloid and then, in the second step, add the weak phosphoric acid.

As further noted hereinabove, one can simply use a conventional grinding process wherein no hydrolysis occurs and pass the highly ground material into a digestion tank equipped with a mixer to effect the hydrolysis.

The phosphate rock ore may be utilized wet directly from the mining or excavation source without any preparation. Generally, the rock would be crushed to a size from about 10 to 20 mm (⅜ to 6/8 of an inch) and this initially crushed rock is fed in a water slurry, generally in the range of about 50% water, to the high speed grinding equipment with high speed mixing generally in the range from about 150 to 1500 rpm. (See U.S. Pat. No. 3,928,016) incorporated herein by reference).

Crushed phosphate rock from line 26 is introduced to reactor 24 wherein it is mixed with dilute phosphoric acid which is recycled from the process through line 28. Reactor 24 is equipped with a stirrer and the slurry is mixed for a time period sufficient to convert the phosphorus values in the rock to mono calcium phosphate. Generally, the slurry is mixed to a temperature below 120° C and preferably from about 70° to 90° C for a period of time varying from about 30 minutes to 3 hours, and preferably, for about 1 hour. Preferably, the amount of phosphoric acid added has a concentration in the range from about 5 to 54% $P_2O_5$ by weight.

The digestion is carried out generally at a minimum temperature of about 50° to a maximum of about 120° C. The preferred range is 70° to 90° C for a time period from 0.3 to 3 hours and preferably from about 1 to 2 hours. The concentration of phosphoric acid based on the amount of $P_2O_5$ is generally from about 15 to 54% with the preferred concentration being 25 to 40%.

As noted, the phosphoric acid can be recycled as discussed herein and it is possible to recycle one to three tons of phosphoric acid per ton of rock phosphate. In any case, a minimum excess of at least 10% of recycled phosphoric acid is used. Preferably, from 1.5 to 2.0 tones per ton of rock is recycled.

Volatile products, such as, fluorine gases and volatile fluorine containing products are removed from tank 24 through line 36. These are then subjected to a gas cleaning process of the conventional type, for example, a scrubber, to produce clean gases and a solution containing $H_2SiF_6$ which is removed in line 38. The gases are removed through line 40.

After the treatment in reactor 24, the overflow from the slurry is passed through line 30 into tank 32 wherein it is mixed with about 70% of the stoichiometric required amount of oxalic acid from line 34, based on the total metals in the reaction mixture.

If desired, the slurry in line 30 can be sent to a cyclone or settling tank 31 for separation of any sand as well as organic material which is not soluble in weak phosphoric acid and which may have been in the rock. However, the intermediate cyclone is not shown since it would be a conventional type of processing step in this art.

In tanks 32 and 44, each of which is equipped with a mixer, calcium oxalate precipitate is formed. Additionally, oxalates of the various metallic impurities are also formed.

It is noted, in this regard, that the oxalate of calcium which is formed during this reaction is extremely insoluble and, in fact, more than 1000 times less soluble than calcium sulphate in water. Moreover, the oxalates of the metallic impurities which are conventionally found in phosphate rock are also highly insoluble. Consequently, the addition of oxalic acid provides a method for producing insoluble forms not only of the calcium values in phosphate rock but also of the metallic impurities.

The mixed slurry of the precipitated calcium oxalate and other precipitated impurities are transferred through line 42 to an additional digestion tank 44 which provides additional retention time for the completion of the reaction and crystal growth of the precipitates. The mixture then goes through line 45 into a separation stage 46 which can be any type of conventional separating apparatus known in the art. Typically, for example, a standard horizontal vacuum filter with multiple counter-current washing stages using polypropylene filter cloths or other types of filter media can be utilized.

Alternately, for example, instead of using a filtration method, the phosphoric acid can be separated from the slurry by using solvents which provide selective extraction of phosphoric acid. Typically, alcohols, such as, butyl, isoamyl, isobutyl, isopropyl, ketones, such as, methylpentatanone, cyclohexanone, methylethyl ketone, esters, such as, butyl acetate, ethers such as, isoproply ether, as well as other known aliphatic and aromatic solvents can be used. As noted, the solvent extraction process would also be a conventional type of method known to the art.

From separating stage 46, calcium oxalate precipitate is removed through line 48 and the phosphoric acid is removed through line 50.

The phosphoric acid separated passes through conventional distillation and concentration apparatus 47 and then back into digestion tank 24. Water and other volatile materials go into scrubber 20. As noted hereinabove, a portion of this phosphoric acid is recycled through line 28 for mixing with the crushed phosphate rock.

The amount of oxalic acid used as well as the amount of phosphoric acid used are directly proportional to the quantities of total metals in the rock. However, it is clear that the amount of oxalic acid used must be a stoichiometric excess of the metals to be removed. In practice, where some metals can be tolerated in the product, the oxalic acid used can be from about 60 to about 150%, more preferably from about 65 to about 120% of the stoichiometric quantity of metals in the reaction mixture. Additionally, the type of oxalic acid used is hydrated oxalic acid having two molecules of water per molecule of oxalic acid. Preferably, the amount of oxalic acid added in the range from 0.8 to 2.0 tons per ton of phosphate rocks.

With respect to the separation step, while the techniques utilized are conventional, it is important to note that by utilizing selective step by step precipitation, not only can the metallic impurities be separated, but they can be separated from one another (except essentially for sodium and potassium). Indeed, it is possible to extract and to separate uranium metal from the mixture and do finally to achieve a clear and pure phosphoric Acid product.

More specifically, the solubility product of calcium oxalate shows that it is quite insoluble, i.e., a solubility product at 25° C of $4 \times 10^{-9}$. the calcium oxalate precipitates first usually at a temperature of 70° to 80° C when only 50 to 80% of the total stoichiometric quantity is added. After the filtration, additional small additions with a decrease in the pH and also decreasing the temperature to 50°–60° allows the remaining calcium to precipitate with magnesium, aluminum, and ferric values.

The addition of more oxalic acid until a stoichiometric excess of 1–5% of free acid (based on the metals to be precipitated or removed) is prepared with subsequent cooling precipitates organic complexes of heavy metals inclusive of uranium. Generally, an excess of from about 1–5% by weight of oxalic acid is used. This excess is calculated on the overall treatment and may actually be added in several separate steps in treating the mixture for precipitation of the insoluble oxalates. The solubility of various oxalates in water 14° C are as follows:

| Ca | oxalate | 0.00067% |
|----|---------|----------|
| Mg | " | 0.07 |
| Al | " | 0.02 |
| Fe ++ | | 0.022 |
| $UO_2$++ | | 0.8 |

The calcium oxalate precipitate which is removed through line 48 is then treated to recover the oxalic acid and to produce gypsum. For this purpose, it is introduced to digestion tank 52 where it is mixed with sulfuric acid as well as other oxalic acid filtrate from line 54 as described hereinafter. This mixture is treated in a stainless steel tank 52 and is then passed on to a crystal growth tank 56.

The amount of sulfuric acid generally ranges in concentration from about 30 to 80%, preferably 50%, and the temperature for the digestion is in the range from about 60 to 90° C preferably from 70° to 80° C for a time period of from about 0.15 to 2 hours and preferably for about 0.3 hours.

After being transferred to tank 56 for crystal growth formation, the mixture is treated in the presence of a slight excess of free sulfuric acid (5% minimum) at a temperature from about 50° to 90° C, and preferably, from about 60° to 70° C for 1–3 hours and preferably for about 1 hour. Thereafter, it is passed to filter 60 through line 58 wherein separated gypsum is recovered in line 62 and the filtrate in line 64 is passed to a second crystallizer 66 for further recovery of any additional oxalic acid values in the filtrate. The mixture of crystallizer 66 goes through lines 68 to filter 70 and the pure ocalic acid is recovered from this filter through line 34. The filtrate is recycled through line 54 into digestion tank 52. After each of these steps, the overall recovery of oxalic acid is about 97%.

The following examples illustrate the present invention:

EXAMPLE 1

5.7 metric tons of Florida phosphate rock (20% moisture) having 23% phosphorus pentoxide content was ground into a slurry to produce a colloidal slurry wherein the particle size of the rock was less than or equal to about 1 micron. This was mixed with 4.725 metric tons of 54% phosphoric acid and mixed in a digestion tank for 2 hours at 80° C. After the digestion, sand was separated from the mixture by cycloning and 3.0 metric tons of oxalic acid were added to the slurry. This was thoroughly mixed and 3.43 metric tons on a dry basis of calcium oxalate were separated by filtration on a polypropylene filter and washed.

Weak phosphoric acid having a minimum of metal impurities (23.6 metric tons having a $P_2O_5$ content of 15%) was concentrated in a multiple effect distillation apparatus to provide a recovery of phosphoric acid of about 96.38%.

The oxalate salts were mixed with 2.7 metric tons of sulfuric acid (100%) and regenerated to form oxalic acid at an efficiency of 97% and 3.768 metric tons on a dry basis of pure calcium sulphate.

EXAMPLE 2

Table I illustrates a typical analysis of a variety of rock phosphates obtained from different areas showing the amount of the different metal values as well as the mineral values in such rocks. An important aspect and advantage of the present process is that all of these types of rocks from the various areas can be treated in an efficient and continuous manner using the present process.

TABLE I

| | Florida | | Utah/Wyoming | | Togo | | Iran | | Brazil | |
|---|---|---|---|---|---|---|---|---|---|---|
| | % | Mol. | % | Mol. | % | Mol. | % | Mol. | % | Mol. |
| $P_2O_5$ | 32.80 | .231 | 25.50 | .179 | 37.89 | .267 | 15.90 | .112 | 40.10 | .282 |
| CaO | 46.10 | .823 | 37.80 | .675 | 51.71 | .923 | 28.64 | .511 | 55.20 | .986 |
| MgO | .80 | .019 | — | — | .09 | .002 | 2.64 | .065 | .11 | .003 |
| $Al_2O_3$ | .80 | .008 | 4.00 | .040 | .67 | .006 | 1.27 | .012 | .10 | .001 |
| $Fe_2O_3$ | .60 | .004 | 1.35 | .008 | 1.60 | .010 | 10.64 | .066 | .06 | .001 |
| $K_2O$ | .11 | .001 | — | — | .03 | .001 | .13 | .001 | .01 | .001 |
| $Na_2O$ | .10 | .002 | 1.40 | .022 | .12 | .002 | .20 | .003 | .03 | .001 |
| Metal total | | .857 | | .745 | | .944 | | .658 | | .993 |
| $-P_2O_5$ | | .231 | | .179 | | .267 | | .112 | | .282 |
| $=P_2O_5$ to add for monophosphate as $P_2O_5$ (M.W. 142) for 100g; rock | | .626 88.7 | | .566 80.4 | | .677 96.1 | | .546 77.5 | | .711 100.9 |

TABLE I-continued

|  | Florida | | Utah/Wyoming | | Togo | | Iran | | Brazil | |
| --- | --- | --- | --- | --- | --- | --- | --- | --- | --- | --- |
|  | % | Mol. | % | Mol. | % | Mol. | % | Mol. | % | Mol. |
| as $H_3PO_4$ (100%) (M.W. 2 × 98) |  | 122.5 |  | 110.9 |  | 132.7 |  | 107.0 |  | 139.4 |
| Oxalic Acid crystallized, Mol. MW 126 |  | .857 |  | .745 |  | .944 |  | .658 |  | .993 |
| for 100g; rock |  | 108.0 |  | 93.9 |  | 118.9 |  | 82.9 |  | 125.1 |

EXAMPLE 3

A rock phosphate from Iran having the following analysis was processed according to the present invention.

| $P_2O_5$ | 15.90 % | .112 moles per 100 g |
| --- | --- | --- |
| CaO | 28.64 % | .511 moles per 100 g |
| MgO | 2.64 % | .065 moles per 100 g |
| $Al_2O_3$ | 1.27 % | .012 moles per 100 g |
| $Fe_2O_3$ | 10.64 % | .066 moles per 100 g |
| $K_2O$ | .13 % | .001 moles per 100 g |
| $Na_2O$ | .12 % | .002 moles per 100 g |
| $SiO_2$ | 30.30 % | |

In order to obtain 1 ton of $P_2O_5$ as the final product, the following initial quantities of materials were used and the amount of the various materials recovered at the different stages of the process are indicated:

1.0417 tons $P_2O_5$ rock (96% recovery)
 6.552 tons rock phosphate
 10.920 tons slurry rock phosphate (60% solid content)
 6.347 tons $P_2O_5$ (100%) recycled
 11.754 tons $P_2O_5$ (54%) recycled concentration of $P_2O_5$ in the slurry 32.40%
 5.432 tons oxalic acid added
 6.217 tons oxalate salts recovered
 4.225 tons sulfuric acid (100%) used
 7.415 tons calcium sulfate recovered.

EXAMPLE 4

A mixture of rock phosphate from Florida and slimes were made into a slurry having the following composition:

|  | Rock | | Slimes | | Mixter rock 30% slurry 70% | | |
| --- | --- | --- | --- | --- | --- | --- | --- |
|  | % | ×0.30 | % | ×0.70 | | | |
| $P_2O_5$ | 32.80 | 9.84 | 12.20 | 8.54 | 18.38 | .129 | Mol/100g |
| CaO | 46.60 | 13.98 | 16.70 | 11.69 | 25.67 | .458 | |
| MgO | .80 | .24 | 2.90 | 2.03 | 2.27 | .056 | |
| $Al_2O_3$ | .80 | .24 | 11.90 | 8.33 | 8.57 | .084 | |
| $Fe_2O_3$ | .60 | .18 | 3.50 | 2.45 | 2.64 | .016 | |
| $K_2O$ | .11 | .03 | .80 | .56 | .59 | .006 | |
| $Na_2O$ | .10 | .03 | .30 | .21 | .24 | .004 | |
| $SiO_2$ | 7.40 | 2.22 | 35.80 | 25.06 | 27.28 | | |
|  |  |  |  |  | metals | .624 | |
|  |  |  |  |  | $P_2O_5$ added 0.624–0.129 = | .495 | |

In order to obtain 1 ton of $P_2O_5$ as the final product, the following initial contents of $P_2O_5$ and materials were utilized and the amounts of the various materials obtained during the stages of the process are as follows:

1.041 tons $P_2O_5$ from rock + slimes phosphate (96%)
 5.668 tons solids content (42.5%)
 13.335 tons slurry
 7.378 tons $P_2O_5$ (54% $P_2O_5$) theoretical
 9.223 tons $P_2O_5$-phosphoric acid (54% $P_2O_5°$) excess 25%
 concentration of $P_2O_5$ in the slurry 22.09%
 silica separated 1.546 tons
 4.456 tons oxalic acid crystallized added
 5.163 tons oxalate salts
 3.465 tons sulfuric acid (100%)
 5.080 tons calcium sulfate.

EXAMPLE 5

Rock phosphate from Florida was made into a slurry having the following composition:

|  | Rock | |
| --- | --- | --- |
|  | % | ×0.30 |
| $P_2O_5$ | 32.80 | 9.84 |
| CaO | 46.60 | 13.98 |
| MgO | .80 | .24 |
| $Al_2O_3$ | .80 | .24 |
| $Fe_2O_3$ | .60 | .18 |
| $K_2O$ | .11 | .03 |
| $Na_2O$ | .10 | .03 |
| $SiO_2$ | 7.40 | 2.22 |

In order to obtain 1 ton of $P_2O_5$ as the final product, the following initial contents of $P_2O_5$ and materials were utilized and the amounts of the various materials obtained during the stages of the process are as follows:

1.041 tons $P_2O_5$ from rock
 3.173 tons solids content (42.5%)
 7.468 tons slurry
 1.043 tons $P_2O_5$ (100%)
 3.261 tons $P_2O_5$ phosphoric acid (32% $P_2O_5°$)
 0.285 tons silica separated
 2.50 tons oxalic acid crystallized added
 2.90 tons oxalate salts
 1.94 tons sulfuric acid (100%)
 2.80 tons calcium sulphate

What is claimed is:

1. A method for the manufacture of phosphoric acid from phosphate rock comprising
 (a) mixing crushed phosphate rock with a stoichiometric excess of phosphoric acid in the presence of water to form a slurry and heating the slurry at a temperature and for a period of time sufficient to convert the rock into a calcium monophosphate;
 (b) adding oxalic acid to the heated slurry to form a slurry of precipitated calcium oxalate therein; and
 (c) recovering the phosphoric acid from the slurry resulting from step (b).

2. The method of claim 1 wherein the calcium oxalate precipitate is separated from the slurry resulting from step (b) and the phosphoric acid is recovered from the liquid obtained from such separation step.

3. The method of claim 1 wherein the phosphoric acid is recovered from the slurry resulting from step (b) by extraction of the slurry with solvents which are selective for phosphoric acid.

4. The method of claim 1 wherein the separated calcium oxalate is treated with a stoichiometric amount of sulfuric acid to regenerate the oxalic acid and produce calcium sulphate.

5. The method of claim 1 wherein the phosphoric acid recovery step is carried out by multiple effect distillation.

6. The method of claim 1 wherein the phosphate rock is crushed to a particle size of less than about 1 micron.

7. The method of claim 1 wherein the heating is carried out for a time period from about 0.3 to 3 hours at a temperature from about 70° to 90° C.

8. The method of claim 2 wherein the calcium oxalate is separated by filtration or cycloning.

9. The method of claim 1 wherein the amount of 100% phosphoric acid added in step (a) is in the range from about 1.00 to 3.00 tons per ton of phosphate rock.

10. The method of claim 1 wherein the amount of oxalic acid added is in the range from about 0.8 to 2.0 tons per ton of phosphate rock.

11. The method of claim 1 wherein the phosphoric acid added has a concentration in the range from about 5 to 54% $P_2O_5$ by weight.

12. The method of claim 1 wherein the oxalic acid is added in a step-wise manner so as to separately precipitate the various metal values in the phosphate rock.

13. The method of claim 12 wherein uranium is separately recovered from the phosphate rock.

14. The method of claim 1 wherein the amount of oxalic acid used is from about 60 to 150% of the stoichiometric amount based on the metals to be removed from the mixture.

15. The method of claim 1 wherein the amount of oxalic acid used is about 70% of the stoichiometric amount based on the metals to be removed from the mixture.

* * * * *